(12) United States Patent
Oikawa et al.

(10) Patent No.: US 9,567,894 B2
(45) Date of Patent: Feb. 14, 2017

(54) ROTARY VALVE

(71) Applicants: MIKUNI CORPORATION, Tokyo (JP); KOKOKU INTECH CO., LTD., Tokyo (JP)

(72) Inventors: Takumi Oikawa, Odawara (JP); Yoshiyuki Kanesaka, Odawara (JP); Toru Tsuchiya, Odawara (JP); Nobutatsu Kan, Saitama (JP)

(73) Assignees: MIKUNI CORPORATION, Tokyo (JP); KOKOKU INTECH CO., LTD., Tokyo (JP)

( * ) Notice: Subject to any disclaimer, the term of this patent is extended or adjusted under 35 U.S.C. 154(b) by 83 days.

(21) Appl. No.: 14/549,963

(22) Filed: Nov. 21, 2014

(65) Prior Publication Data

US 2015/0075452 A1    Mar. 19, 2015

Related U.S. Application Data

(63) Continuation of application No. PCT/JP2013/064154, filed on May 22, 2013.

(30) Foreign Application Priority Data

May 24, 2012   (JP) .................................. 2012-118975

(51) Int. Cl.
    *F16K 25/00*       (2006.01)
    *F01P 7/14*        (2006.01)
    (Continued)

(52) U.S. Cl.
    CPC .................. *F01P 7/14* (2013.01); *F01P 11/14* (2013.01); *F16K 5/0464* (2013.01);
    (Continued)

(58) Field of Classification Search
    CPC ......... F01P 7/14; F01P 11/14; F01P 2007/146; Y10T 137/86871; F16K 5/0464; F16K 11/0853; F16K 5/0471
    (Continued)

(56) References Cited

U.S. PATENT DOCUMENTS

3,076,631 A    2/1963  Grove
3,266,769 A *  8/1966  Shand ........................... 251/172
(Continued)

FOREIGN PATENT DOCUMENTS

JP    64-58874     3/1989
JP    1-206169     8/1989
(Continued)

OTHER PUBLICATIONS

Extended European Search Report dated Dec. 17, 2015 in corresponding European Patent Application No. 13794727.1.
(Continued)

*Primary Examiner* — Marguerite McMahon

(57) ABSTRACT

A rotary valve that includes a rotor, and a casing including a rotor accommodating space that accommodates the rotor. A rotor opening which is a passage of cooling water is provided in the rotor. Openings which communicate with the rotor opening are provided at positions of an inner circumferential surface of the rotor accommodating space which oppose an outer circumferential surface of the rotor. Seal members are provided to extend from the openings toward the rotor. A tip end abutting portion of the seal member which abuts on the rotor includes an inwardly curved portion. The inwardly curved portion functions as a seal and also functions as a spring. The inwardly curved portion is narrowed inwardly toward a tip end side, and is curved to be folded back.

13 Claims, 6 Drawing Sheets

(51) Int. Cl.
  *F16K 5/04* (2006.01)
  *F16K 11/085* (2006.01)
  *F01P 11/14* (2006.01)

(52) U.S. Cl.
  CPC ........ *F16K 5/0471* (2013.01); *F16K 11/0853* (2013.01); *F01P 2007/146* (2013.01); *Y10T 137/86871* (2015.04)

(58) Field of Classification Search
  USPC .......... 123/41.1, 41.08; 137/625.47; 251/309
  See application file for complete search history.

(56) References Cited

U.S. PATENT DOCUMENTS

| | | | |
|---|---|---|---|
| 3,584,831 A | | 6/1971 | Hafele |
| 4,396,199 A | * | 8/1983 | Boyd et al. ................... 277/637 |
| 4,397,446 A | * | 8/1983 | Jelinek ........................ 251/309 |
| 4,928,921 A | * | 5/1990 | Steele ......................... 251/175 |
| 5,535,986 A | * | 7/1996 | Hutchens et al. ............ 251/306 |
| 6,840,502 B2 | * | 1/2005 | Haushaelter et al. ........ 251/173 |
| 2007/0267588 A1 | * | 11/2007 | McLane et al. .............. 251/175 |
| 2010/0282190 A1 | * | 11/2010 | Stoermer .................... 123/41.08 |
| 2015/0075453 A1 | * | 3/2015 | Oikawa ........................ 123/41.1 |
| 2015/0075658 A1 | * | 3/2015 | Tsuchiya et al. ......... 137/625.47 |
| 2015/0122359 A1 | * | 5/2015 | Tsuchiya et al. ......... 137/625.47 |

FOREIGN PATENT DOCUMENTS

| | | |
|---|---|---|
| JP | 2-46378 | 2/1990 |
| JP | 4-117965 | 10/1992 |
| JP | 8-247306 | 9/1996 |
| JP | 9-119532 | 5/1997 |
| JP | 2000-193104 | 7/2000 |
| WO | WO 2007/136942 A2 | 11/2007 |

OTHER PUBLICATIONS

International Search Report mailed Jun. 18, 2013, in corresponding International Patent Application No. PCT/JP2013/064154.

* cited by examiner

ROTARY VALVE

CROSS-REFERENCE TO RELATED APPLICATIONS

This application is a continuation application, filed under 35 U.S.C. §111(a), of International Application PCT/JP2013/064154, filed on May 22, 2013, which claims the foreign priority benefit of Japanese Patent Application No. 2012-118975, filed May 24, 2012, the disclosures of which are incorporated herein by reference.

BACKGROUND

1. Field

Various embodiments relate to a rotary valve including a rotor which is rotated to open and close a flow passage.

2. Description of Related Art

In an engine (internal combustion engine) of a vehicle such as an automobile, for the purpose of enhancing the warm-up performance of the engine, enhancing the fuel efficiency by operating the engine at an optimal temperature, and the like, it is considered that a bypass passage through which cooling water bypasses a radiator and is returned to the engine as it is provided separately from a main passage through which the cooling water is circulated between the engine and the radiator, a cooling water control valve is provided in the main passage, and by controlling the opening degree of the cooling water control valve according to the temperature of the cooling water and the other values, the amount of the cooling water which flows through the main passage and is cooled by the radiator is controlled. Note that, the cooling water is circulated by a pump driven by the engine, and during an operation of the engine, the cooling water is mainly circulated through the main passage in a case where the cooling water control valve is opened, and is circulated through the bypass passage in a case where the cooling water control valve is closed.

For example, during the start-up of the engine at a low cooling water temperature, the main passage is blocked to allow the cooling water to return to the engine as it is from the bypass passage without passing through the radiator, thereby accelerating the warm-up of the engine. In addition, for example, in order to control the temperature of the cooling water to optimize the combustion of a fuel in the engine even after the warm-up, opening and closing (the opening degree) of the cooling water control valve is adjusted.

In the cooling water control valve, the use of a rotary valve or the like is considered.

In the rotary valve, for example, a flow passage is provided in a rotor, and in a housing which accommodates the rotor, an opening which is connected to an external flow passage and communicates with the flow passage in the rotor in a case where the angle of the rotor is an angle at which the rotor is opened is formed.

In addition, a seal is disposed between the opening of the housing and an opening of the flow passage of the rotor such that distribution of flowing water can be efficiently performed even when there is a gap between the openings.

For example, a structure in which a large gap is provided between the opening of the housing and the opening of the rotor and a packing is disposed therebetween is suggested (for example, refer to Patent Literature 1).

The packing is formed in a cylindrical shape in which both ends are open, one end portion serves as a seal for the opening of the rotor, and the other open end serves as a seal for the opening of the housing. In Patent Literature 1, the outer circumferential surface of the rotor and the inner circumferential surface of a part of the housing that accommodates the rotor are formed in cylindrical shapes, and the distance between the seal on the housing side and the seal on the rotor side is substantially constant at any position along the circumferential direction of the openings of the housing and the rotor.

Note that, for example, in a case where the inner surface which is provided with the opening on the housing side and opposes the rotor is a flat surface, the seal on the housing side has a flat surface shape, and the seal on the rotor side has a cylindrical surface shape. For this reason, the distance between the seals varies depending on the position in the circumferential direction. In this case, the length of a rubber as the packing disposed between the seals varies, and thus surface pressure applied to the seal from a surface that abuts on the seal varies with position. Therefore, there is concern that the function of the seal may not be sufficiently exhibited. As described above, by causing the distance between the seals to rarely change with position, the surface pressure can be allowed to be substantially constant even at different positions in the circumferential direction of the seal.

3. Patent Literature

Patent Literature 1: Japanese Publication No. 2000-193104 A

SUMMARY

However, in a case where sealing is performed only by an elastic force based on compression of a rubber-like seal member body, for example, the use of a hard rubber-like member is considered. However, in this case, there is a problem of followability due to a small displacement, or there is a problem in that the rotation of the rotor is stopped when foreign matter becomes stuck or the like. In combination with the seal member, for example, it is preferable to use a spring, and for example, it is preferable to use a coil spring, a wave washer, or the like by which a certain degree of displacement is expected.

In addition, in consideration of positioning and holding of the seal member, it may be preferable to dispose a cylindrical member that supports the seal on the housing side, and in consideration of assembly, it may be preferable that a cylindrical nipple or the like that supports a cylindrical tool member be inserted into a part of the housing to which an external pipe is connected. In this case, a seal ring for sealing between the cylindrical nipple and the part of the housing which is formed in a cylindrical shape of the periphery thereof is needed.

Furthermore, the rotor slides on a part of the seal member which is pressed against the rotor, and thus in a state where a seal having a high coefficient of friction comes into contact with the rotor, a large force is needed for the rotation of the rotor. Here, it may be preferable that the part of the seal member which comes into contact with the rotor be made of a member having a low coefficient of friction, for example, a resin having low frictional properties such as polytetrafluoroethylene.

For this reason, between the rotor and the housing, as a seal mechanism which efficiently distributes flowing water between the opening of the outer circumferential surface of the rotor and the opening of the housing, for example, a cylindrical seal member, a spring which biases the seal member to press a sealing part, and a seal ring are needed to correspond to various functions. In addition, it may be desirable that the part which comes into contact with the rotor have a low coefficient of friction.

When the seal parts of the rotor and the housing have such complex structures, the cost of the rotary valve is increased, and an assembly operation becomes complex.

Therefore, a seal member which is a single member that realizes members having a plurality of functions needed to enable a reduction in cost and an efficient assembly operation with a structure that enables efficient distribution of flowing water is required.

Various embodiments have been made taking the forgoing circumstances into consideration, and a purpose thereof is to provide a rotary valve that uses a seal member having a shape in which a plurality of functions is integrated.

In order to achieve the object described above, a rotary valve includes: a rotor which is rotated to open and close a flow passage; and a casing which accommodates the rotor, wherein a rotor opening which is a part of a passage of a fluid is formed in a cylindrical outer circumferential surface of the rotor, a rotor accommodating space which rotatably accommodates the rotor is formed in the casing, a casing opening which is a passage of the fluid when communicating with the rotor opening is formed in an inner surface of the rotor accommodating space of the casing that faces the rotor, a cylindrical seal member which extends to abut on the outer circumferential surface of the rotor including the rotor opening is provided in the casing opening, the cylindrical seal member includes a cylindrical body portion in which a tip end shape on the rotor side is a shape along the outer circumferential surface of the rotor, and a tip end abutting portion which is provided in a tip end portion of the body portion on the rotor side to be integrated with the body portion toward the outer circumferential surface of the rotor and abuts on the outer circumferential surface of the rotor, the tip end abutting portion has a cylindrical shape and has a shape that is curved along the outer circumferential surface of the rotor, the tip end abutting portion includes an inwardly curved portion which is narrowed inwardly toward a tip end side and is curved to be folded back and/or an outwardly curved portion which is widened outwardly toward the tip end side and is curved to be folded back, and the seal member is disposed so that the inwardly curved portion and/or the outwardly curved portion is pressed against the outer circumferential surface of the rotor.

According to this configuration, the tip end abutting portion of the seal member includes the inwardly curved portion which is narrowed inwardly and is curved to be folded back and/or the outwardly curved portion which is widened outwardly and is curved to be folded back, and the inwardly curved portion and/or the outwardly curved portion functions as a seal which abuts on the rotor and also functions as a spring.

That is, the inwardly curved portion and/or the outwardly curved portion has a shape in which, for example, an elastic force is not applied by a rubber-like resin as a lump, but for example, a biasing force is easily applied by equivalent elastic deformation as that of a leaf spring or the like. That is, since the cross-section thereof has a shape that is bent and folded back, in a case where a pressing force is applied, a part closer to the base end side than the contact position that comes into contact with the rotor in the direction intersecting the pressing direction functions as a spring. In addition, the apex part of the folded part comes into contact with the outer circumferential surface of the rotor, and thus sealing characteristics can be easily secured compared to a case where the tip end comes into contact therewith.

The shape of the inwardly curved portion and/or the outwardly curved portion along the circumferential direction is the same curved shape as the rotor opening, and even when the rotor opening has a shape along the cylindrical surface, the inwardly curved portion and/or the outwardly curved portion which functions as a spring also has the same cylindrical surface shape such that an elastic force is less likely to change with position.

In addition, it may be preferable that the end surface of the body portion of the seal member on the base end side thereof have a shape which comes into contact with the member on the casing side, and the tip end abutting portion of the inwardly curved portion and/or the outwardly curved portion as a spring is pressed against the outer circumferential surface of the rotor and receives a reaction force from the member on the casing side to be supported. In addition, in a case where a seal is also needed on the casing side, the base end of the body portion of the inwardly curved portion and/or the outwardly curved portion as a spring is pressed against the member on the casing side and thus can function as the seal.

According to a configuration, it may be preferable that the inwardly curved portion and/or the outwardly curved portion of the tip end abutting portion of the seal member has a smaller wall thickness than the body portion.

According to this configuration, since the wall thickness of the inwardly curved portion and/or the outwardly curved portion is smaller than that of the body portion, the inwardly curved portion and/or the outwardly curved portion is easily displaced, and the inwardly curved portion and/or the outwardly curved portion easily functions as a spring.

According to a configuration, it may be preferable that the casing opening is formed in the casing to have a cylindrical shape, a cylindrical support cylindrical portion which supports the seal member is inserted into the casing opening in a state of being inserted into the body portion of the seal member, and a thick wall portion which is thicker than an interval between the support cylindrical portion and the casing opening is provided in a part of the body portion of the seal member between the support cylindrical portion and the casing opening.

According to this configuration, since the cylindrical support cylindrical portion is inserted into the cylindrical casing opening of the casing and the support cylindrical portion is inserted into the body portion of the cylindrical seal member, in the case of positioning the seal member, there is concern that the function as the seal is not sufficient between the inner circumferential surface of the casing opening and the outer circumferential surface of the seal member or between the outer circumferential surface of the support cylindrical portion and the inner circumferential surface of the seal member.

Here, the thick wall portion which is thicker than the interval between the support cylindrical portion and the casing opening is provided in the part disposed between the support cylindrical portion of the body portion of the seal member and the casing opening. The thick wall portion is elastically deformed and thus can exhibit the function as the seal between the outer circumferential surface of the thick wall portion of the seal member and the inner circumferential surface of the casing opening and between the inner circumferential surface of the thick wall portion of the seal member and the outer circumferential surface of the support cylindrical portion.

According to a configuration, it may preferable that the casing opening is formed in the casing to have a cylindrical shape, a cylindrical support cylindrical portion which supports the seal member is inserted into the casing opening in a state of being inserted into the body portion of the seal member, and the tip end abutting portion is provided closer to the rotor side than a tip end portion of the support cylindrical portion.

According to this configuration, when the inwardly curved portion and/or the outwardly curved portion functions as a spring, it is preferable that a member that interferes with the displacement of the inwardly curved portion and/or the outwardly curved portion be absent. In addition, since the inwardly curved portion and/or the outwardly curved portion is provided closer to the tip end side than the support cylindrical portion, even when the inwardly curved portion and/or the outwardly curved portion is displaced, a structure which does not come into contact with the support cylindrical portion is achieved. Accordingly, the inwardly curved portion and/or the outwardly curved portion can achieve a structure that easily functions as a spring.

A seal for a rotary valve that includes a rotor and a casing having a rotor accommodating space to accommodate the rotor. The seal includes a seal member that extends to abut on an outer circumferential surface of the rotor, the cylindrical seal member being provided in a casing opening of the rotor accommodating space. The seal member includes a body portion and a tip end abutting portion provided at a tip end portion of the body portion, the tip end abutting portion being integrated with the body portion toward the outer circumferential surface of the rotor and abutting on the outer circumferential surface of the rotor. The tip end abutting portion includes at least one of an inwardly curved portion that is curved inwardly toward an inside of the casing opening and an outwardly curved portion that is curved outwardly toward an outside of the casing opening.

According to the various embodiments, a plurality of necessary functions can be integrated into a single seal member, and thus a reduction in cost and an efficient assembly operation can be achieved compared to the case of using a plurality of members corresponding to the respective functions.

BRIEF DESCRIPTION OF DRAWINGS

These and/or other aspects and advantages will become apparent and more readily appreciated from the following description of the embodiments, taken in conjunction with the accompanying drawings of which.

DESCRIPTION OF EMBODIMENTS

Hereinafter, various embodiments will be described with reference to the drawings.

A rotary valve is used, for example, to control cooling water of the engine of a vehicle, and in an engine cooling system which includes a main flow passage that is mounted on an engine block of the engine to circulate the cooling water between the engine block and a radiator, a sub-flow passage which supplies the cooling water to a device (for example, a heater or a throttle) that needs temperature adjustment using the cooling water, and a bypass flow passage that bypasses the radiator, the rotary valve is used to open and close the main flow passage and the sub-flow passage.

Figure 1:
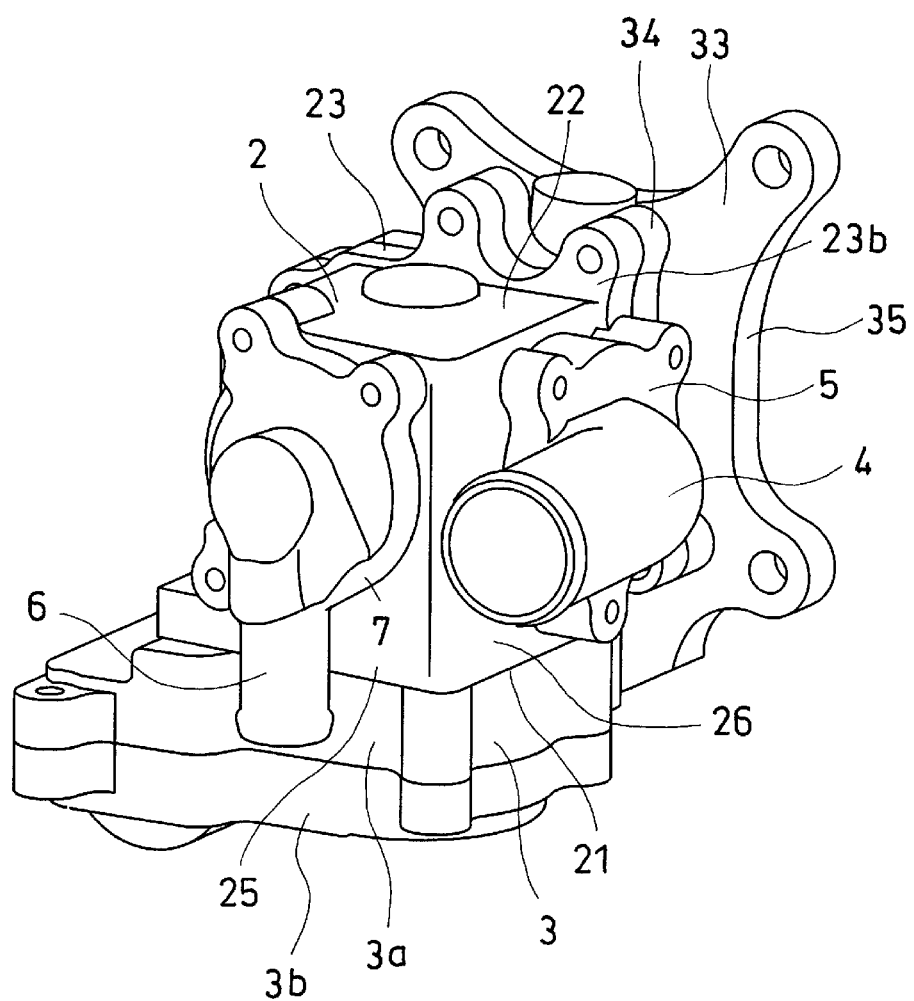
FIG. 1 is a perspective view illustrating a rotary valve of an embodiment.
Figure 2:
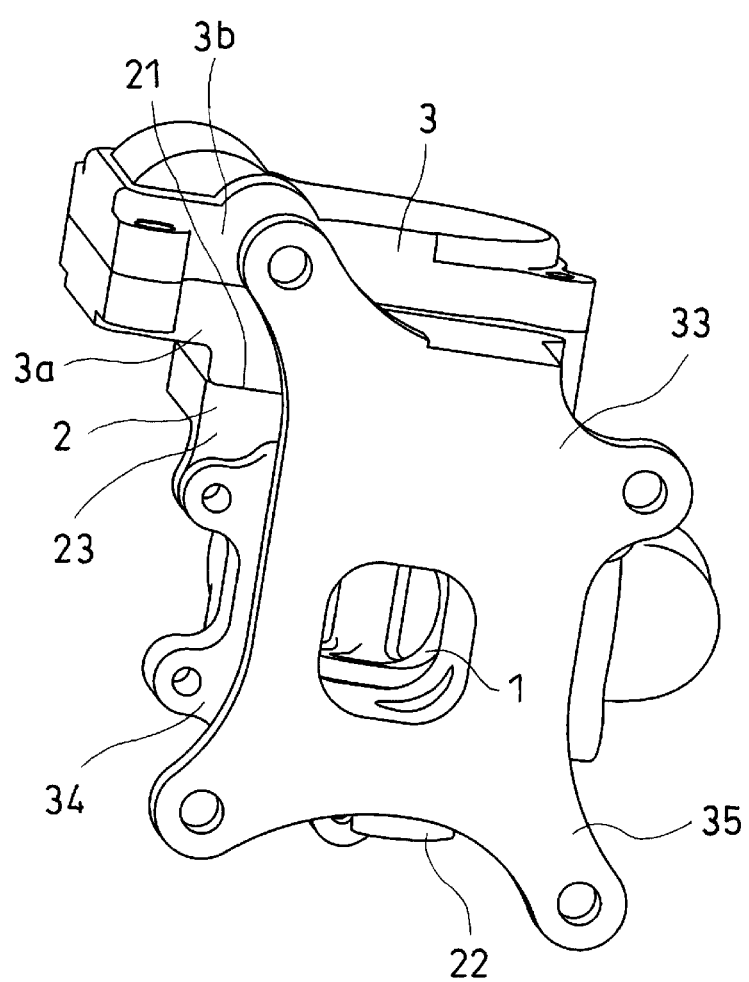
FIG. 2 is a perspective view illustrating the rotary valve.
Figure 3:
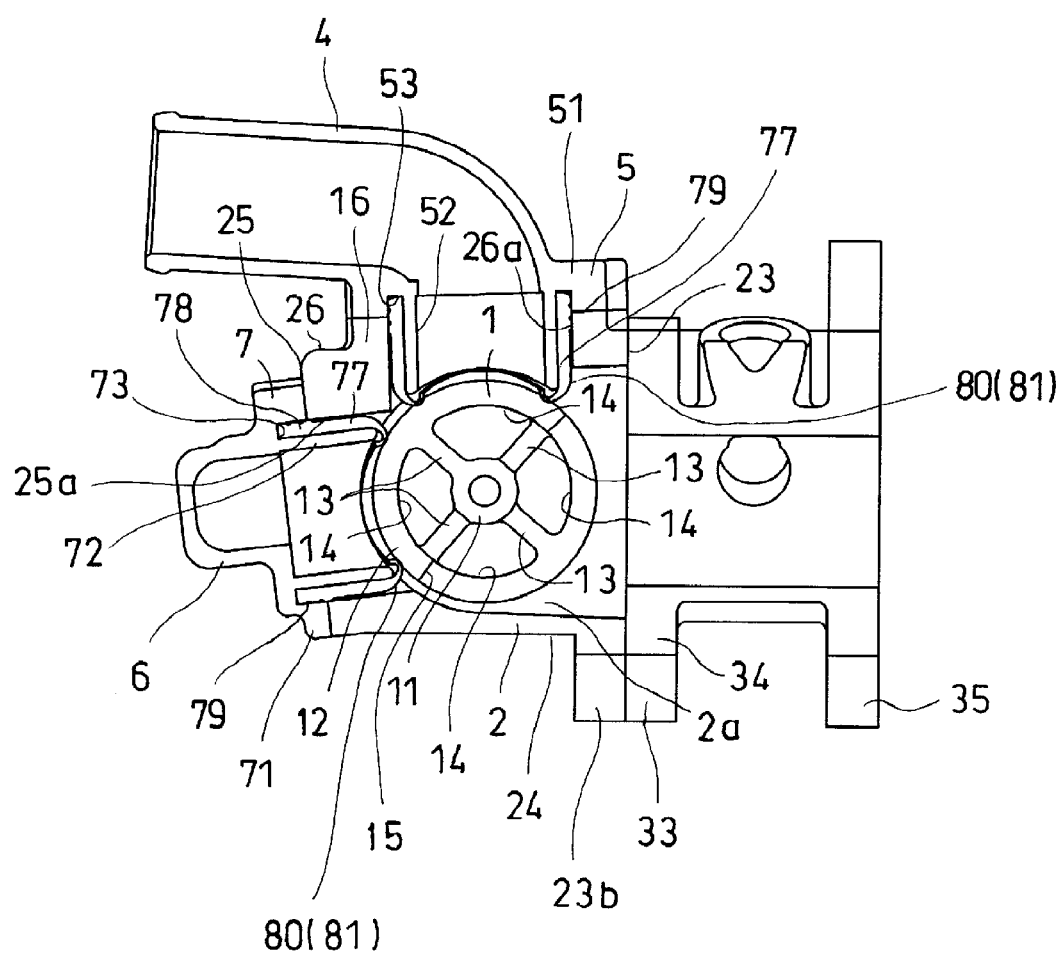
FIG. 3 is a partially cutaway perspective view illustrating the rotary valve.

As illustrated in FIGS. 1 to 3, a rotor 1 (illustrated in FIG. 3), a casing 2 which rotatably accommodates the rotor 1, a rotation driving device 3 (illustrated as an external form covered by casings 3a and 3b for the rotation driving device 3) which drives the rotor 1 to rotate, a main connection member 5, which includes a main connection pipe 4 that is connected to the main flow passage and causes the cooling water (fluid) to flow out (or flow in), and a sub-connection member 7, which includes a sub-connection pipe 6 that is connected to the sub-flow passage and causes the cooling water to flow out (or flow in), are provided.

The rotor 1 includes a cylindrical rotating shaft 11, which is thin and long, a cylindrical portion 12, which is formed in a thick cylindrical shape centered on the rotating shaft 11, and spoke portions 13, which have shapes that extend in four directions from the rotating shaft 11 along the radial direction of the cylindrical portion 12 at both end portions of the cylindrical portion 12 in the axial direction thereof and are connected to the cylindrical portion 12.

Right and left end surface parts of the rotor 1 are formed as the spoke portions 13, which have shapes that extend from the above-described rotating shaft 11 in the four directions, and thus there are openings between the parts that extend in the four directions. Therefore, four openings (end surface side openings) 14 are respectively provided in the right and left end surfaces of the rotor 1, and the area occupied by the openings 14 is larger than the area occupied by the spoke portions 13 at the end surfaces of the rotor 1.

In addition, the end portions of the rotating shaft 11 respectively protrude from both the end surfaces of the rotor 1.

In the outer circumferential surface of the rotor 1 (the cylindrical portion 12), a rotor opening 15 having a circumferential length of substantially the half (slightly shorter than the half) of the outer circumferential surface is provided. Both the end portions of the rotor opening 15 in the circumferential direction are formed in a semicircular shape. In addition, the length of the width of the rotor opening 15 along the axial direction of the rotor 1 is equal to or longer than the half of the length of the rotor 1 along the axial direction, and for example, equal to or longer than two thirds thereof.

The rotor opening 15 of the outer circumferential surface of the rotor 1 is provided in the cylindrical portion 12 of the rotor 1, and penetrates through the cylindrical portion 12 so that the inside and the outside of the rotor 1 (the cylindrical portion 12) communicate with each other.

A part of the outer circumferential surface of the rotor 1 (cylindrical portion 12) excluding the rotor opening 15 is a rotor outer circumference blocking surface 16, which is an outer circumferential surface with no opening. Here, the length of the rotor opening 15 along the circumferential direction of the outer circumferential surface of the rotor 1 is substantially the half of the length of the entire circumference, and the length of the rotor outer circumference blocking surface 16 with no opening is substantially the half of the length along the circumferential direction of the outer circumferential surface of the rotor 1.

The casing 2 is formed substantially in a hexahedron (rectangular parallelepiped) box shape, and a rotor accommodating space 2a (illustrated in FIG. 3), which rotatably accommodates the rotor 1, is formed inside the casing 2. Two surfaces among the six surfaces of the casing 2, which oppose each other, have inner surfaces that oppose the end surfaces of the rotor 1, and the other four surfaces have inner surfaces that oppose the outer circumferential surface of the rotor. Here, plate-like parts which respectively form the surfaces of the hexahedron are referred to as a first plate-like portion 21 to a sixth plate-like portion 26.

The plate-like parts having inner surfaces that oppose the end surfaces of the rotor 1 are referred to as the first plate-like portion 21 and the second plate-like portion 22, and the plate-like parts having inner surfaces that oppose the outer circumferential surface of the rotor 1 are referred to as the third plate-like portion 23 to the sixth plate-like portion 26.

The rotation driving device 3 is mounted on the first plate-like portion 21, which is one of the first plate-like portion 21 and the second plate-like portion 22. A hole into which the rotor 1 can be inserted is provided in the first plate-like portion 21. The hole is blocked by a lid member (not illustrated). The driving shaft of the rotation driving device 3 passes through the lid member in a state of being sealed, and is connected to the rotor 1 to drive the rotor 1 to rotate.

The rotation driving device 3 is provided with, for example, a motor which rotates the driving shaft therein. The driving shaft is connected to the motor via a decelerator. The driving shaft is connected to one end portion of the rotating shaft 11 of the rotor 1. The other end portion of the rotating shaft 11 is rotatably supported by a bearing portion (not illustrated) of the second plate-like portion 22.

The third plate-like portion 23 of which the inner surface opposes the outer circumferential surface of the rotor 1 is provided so that the outer circumferential part thereof extends outward in a flange shape to serve as a flange portion 23b, and a part surrounded by the first plate-like portion 21, the second plate-like portion 22, the fourth plate-like portion 24, and the sixth plate-like portion 26 is an opening.

The flange portion 23b is mounted at a mounting position having an opening of the engine block of the engine via a connection member 33. The connection member 33 is a cylindrical member in which a flange portion 34 which is connected to the flange portion 23b is provided on the opening side of one end portion thereof and a flange portion 35 which is connected to the engine block is provided on the other opening side. The rotary valve is connected to the engine block via the connection member 33.

The third plate-like portion 23 to which the connection member 33 is connected is provided with the opening as described above so that the cooling water can flow into the opening from the engine block side via the connection member 33. A configuration may also be employed in which the cooling water flows out to the engine block side.

The sub-connection member 7 described above is mounted on the outer surface of the fifth plate-like portion 25. The fifth plate-like portion 25 is provided with an opening (casing opening) 25a which communicates with the sub-connection pipe 6 of the sub-connection member 7.

The opening 25a is the opening 25a on the outflow side (may also be the inflow side) at which the cooling water flows out from the rotary valve to the outside. For example, the cooling water which flows out from the opening 25a is circulated through the sub-flow passage (for example, including a heater or the like), and is returned to the engine block from a pump.

The fifth plate-like portion 25 is disposed to oppose and be substantially parallel to the third plate-like portion 23 having an opening 23a on the inflow side (may also be outflow side), and is disposed to be substantially perpendicular to the sixth plate-like portion 26 and the fourth plate-like portion 24.

The opening 25a has a cylindrical inner circumferential surface.

The sub-connection member 7 includes a plate-like connection portion 71, and a support cylindrical portion 72 having a cylindrical shape that extends from the connection portion 71 in a state of being inserted into the opening 25a. A through-hole is formed in the connection portion 71 of the sub-connection member 7, and the through-hole communicates with the inside of the support cylindrical portion 72 on the inner surface side of the connection portion 71 and communicates with the inside of the sub-connection pipe 6 on the outer surface side. Accordingly, the support cylindrical portion 72 and the sub-connection pipe 6 communicate with each other.

In addition, the inner surface of the connection portion 71 comes into surface contact with the side surface of the outside of the opening 25a of the fifth plate-like portion 25, such that the opening 25a is in a state of being blocked in a state where the sub-connection member 7 is connected to the casing 2. However, the opening 25a communicates with the sub-connection pipe 6 via the support cylindrical portion 72.

A tip shape of the support cylindrical portion 71 has a curved shape along the cylindrical outer circumferential surface.

An annular support groove 73 is formed on the outer circumferential side of the support cylindrical portion 72 of the connection portion 71.

The inner diameter of the cylindrical opening 25a and the outer diameter of the annular support groove 73 are substantially equal to each other. The inner diameter of the support groove 73 and the outer diameter of the support cylindrical portion 72 are substantially equal to each other. The outer diameter of the support cylindrical portion 72 is narrower than the inner diameter of the opening 25a. In addition, the opening 25a, the support cylindrical portion 72, and the support groove 73 are disposed on substantially the same axis.

Figure 4:
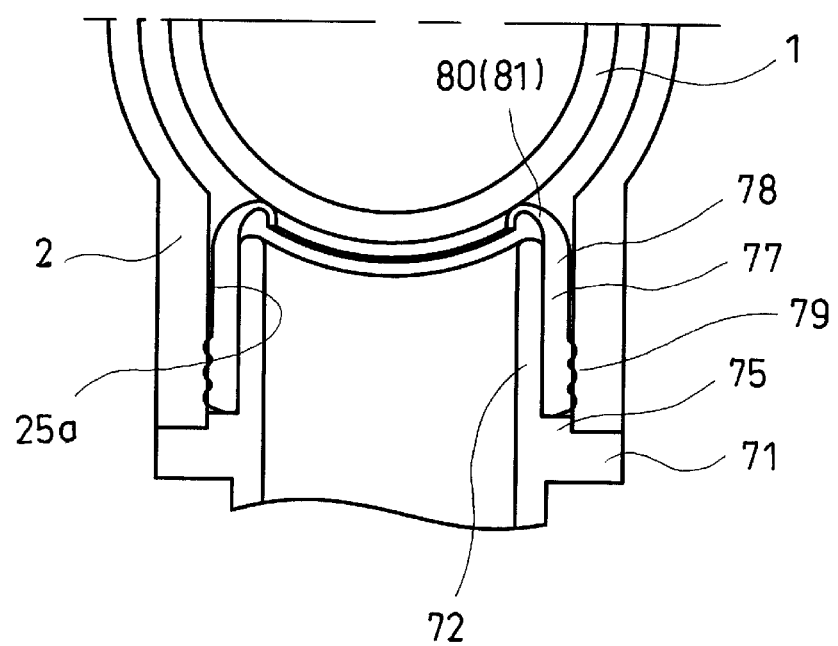
FIG. 4 is a main part cross-sectional view illustrating the rotary valve.
Figure 5:
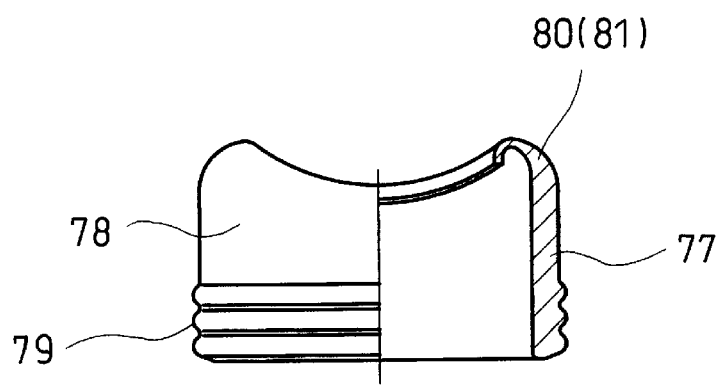
FIG. 5 is a partial cross-sectional view illustrating a seal member of the rotary valve.

As illustrated in a schematic cross-sectional view of FIG. 4, instead of providing the support groove 73, an annular protrusion 75 may be provided in the sub-connection member 7.

The outer diameter of the annular protrusion 75 is substantially equal to the inner diameter of the opening 25a so as to be inserted into the opening 25a. The inner diameter of the protrusion 75 is equal to the outer diameter of the support cylindrical portion 72.

A cylindrical seal member 77 is provided in the support cylindrical portion 72 so as to cover the outer circumference thereof. That is, the support cylindrical portion 72 is inserted into the cylindrical seal member 77. The seal member 77 is, for example, a rubber or resin member, and is made of a resin member having a relatively low coefficient of friction. The inner diameter of the seal member 77 is equal to or slightly narrower than the outer diameter of the support cylindrical portion 72, and the support cylindrical portion 72 is inserted into the seal member 77 in a state where the seal member 77 is elastically deformed so that the diameter thereof is increased.

As illustrated in FIGS. 4 to 8, the seal member 77 is provided with a cylindrical body portion 78, a thick circumferential surface seal portion 79 provided in the base end portion of the body portion 78, and a tip end abutting portion 80 provided in the tip end portion.

The seal member 77 is disposed so that the end surface of the base end portion thereof abuts on the bottom surface of the support groove 73. As illustrated in FIG. 4, in a case where the protrusion 75 is provided, the end surface of the base end portion of the seal member 77 abuts on the protrusion 75.

In addition, as the circumferential surface seal portion 79, three protrusions (in three stages) which are formed along the circumferential direction are provided in the base end portion along the axial direction. The cross-section of the protrusion has a substantially arc shape which expands toward the outer circumferential side. The wall thickness (thickness) of the circumferential surface seal portion 79 at the apex of the protrusion of the circumferential surface seal portion 79 is longer than the length of the half of the difference between the inner diameter and the outer diameter of the support groove 73.

The wall thickness (thickness) at the apex of the protrusion of the circumferential surface seal portion 79 is longer than the length of the half of the difference between the outer diameter of the support cylindrical portion 72 and the inner diameter of the opening 25a of the fifth plate-like portion 25 of the casing 2.

Here, a part which is disposed inside the support groove 73 of the circumferential surface seal portion 79 and a part which is disposed between the outer circumferential surface of the support cylindrical portion 72 and the inner circumferential surface of the opening 25a are elastically deformed to respectively correspond to the intervals thereof.

The end surface of the body portion 78 on the base end portion (including the circumferential surface seal portion 79) side is disposed on a single plane along the bottom surface of the support groove 73. The shape of the tip end portion of the body portion 78 that faces the rotor 1 side is a shape that is curved along the cylindrical surface. That is, the shape is a linear shape in a direction along the axial direction of the rotor 1 and is a circumferential shape in a direction along the circumferential direction, which follows the cylindrical surface. The shape of the tip end of the body portion 78 is the same as the shape of the tip end of the support cylindrical portion 72.

In this embodiment, the tip end abutting portion 80 is an inwardly curved portion 81 which is formed to extend from the tip end of the body portion 78 toward the rotor 1, is narrowed inwardly toward the tip end side, and is curved to be folded back. The diameter of the inwardly curved portion 81 is reduced toward the tip end side. In addition, since the inwardly curved portion 81 is curved to be folded back, the cross-sectional shape thereof is a fishhook shape with no barb.

Moreover, the thickness of the tip end side of the inwardly curved portion 81 is smaller than that on the base end side thereof. In addition, the inwardly curved portion 81 has a curved shape which is substantially the same as a shape which draws a circle on the above-described cylindrical surface of the tip end portion of the body portion 78, and is disposed between the tip end of the body portion 78 and the outer circumferential surface of the rotor 1. Therefore, in a state where the inwardly curved portion 81 abuts on the outer circumferential surface of the rotor 1, the abutting part thereof has a shape along the cylindrical surface.

The part of the inwardly curved portion 81 which comes into contact with the outer circumferential surface of the rotor 1 is not the tip end which is folded back to face the opposite side to the rotor 1, and a part which faces the outer circumferential surface of the rotor 1 in the curved portion between the tip end and the base end of the inwardly curved portion 81 comes into contact with the rotor 1. In addition, the part of the inwardly curved portion 81 which comes into contact with the rotor 1 is a part that is already thinned from the body portion 78.

That is, the thickness of the base end of the inwardly curved portion 81 is substantially the same as that of the body portion 78, and is narrowed toward the tip end. However, the thickness of a part from the position slightly closer to the base end side than the part that comes into contact with the rotor 1 to the tip end is a substantially constant thickness, and this part is the thinnest state.

The inwardly curved portion 81 functions as a spring when elastically deformed due to this shape, and the spring is in a state of being elastically deformed by being pressed against the outer circumferential surface of the rotor 1. The tip end side of the inwardly curved portion 81 (the tip end abutting portion 80) has a shape that is curved along the cylindrical surface to correspond to the outer circumferential surface of the rotor 1, and as the tip end portion of the body portion 78 has a shape that is curved along the cylindrical surface as described above, the base end portion of the inwardly curved portion 81 has a shape that is curved along the cylindrical surface.

The distance between the part of the inwardly curved portion 81 that abuts on the rotor 1 and the base end portion thereof is constant regardless of position in the circumferential direction. That is, the axial direction of the cylindrical surface shape which is the shape of the inwardly curved portion 81 on the tip end side thereof and the axial direction of the cylindrical surface shape which is the shape on the base end side thereof are disposed to be parallel to each other, and the tip end side and the rear end side of the inwardly curved portion 81 are in a state of following the surface in the same direction as the cylindrical surface. In addition, the shape of the tip end portion of the support cylindrical portion 72 is also substantially the same as the tip end shape of the body portion 78, and the inwardly curved portion 81 is disposed closer to the tip end side than the support cylindrical portion 72.

In addition, the cylindrical inwardly curved portion 81 has a structure which comes into contact with the rotor 1 over the entire circumference. Therefore, in a state where the inwardly curved portion 81 comes into contact with the rotor outer circumference blocking surface 16 of the rotor 1, the tip end side opening of the cylindrical seal member 77 is in a state of being completely blocked. At this time, the support cylindrical portion 72 is in a state of being blocked, and the sub-connection pipe 6 is in a state of being blocked.

In a case where the rotor opening 15 and the inwardly curved portion 81 overlap each other, the valve is in a state of being opened, and the cooling water that flows from the opening of the third plate-like portion can be in a state of flowing out from the engine block side to a sub-passage side via the internal space of the rotor 1. A configuration may also be employed in which the inflow and outflow of the cooling water are switched.

The opening degree of the valve is adjusted by a ratio at which the rotor opening 15 and the inwardly curved portion 81 overlap, thereby adjusting a flow rate.

Here, the rotor opening 15 has a shape in which an opening for the sub-passage and an opening for a main passage which will be described later are integrated along the circumferential direction, and the length of the rotor opening 15 along the circumferential direction of the rotor 1 is longer than the length of the inwardly curved portion 81 in the circumferential direction and the diameter of the part which comes into contact with the rotor 1.

The above-mentioned main connection member 5 is mounted on the outer surface of the sixth plate-like portion 26. The sixth plate-like portion 26 is provided with an opening (casing opening) 26a which communicates with the main connection pipe 4 of the main connection member 5.

The opening 26a is the opening 26a on the outflow side (may also be inflow side) through which the cooling water flows out from the rotary valve to the outside. For example, the cooling water which flows out from the opening 26a is circulated through the main flow passage. The cooling water is returned to the engine block from the pump via the radiator.

The sixth plate-like portion 26 is disposed to be substantially perpendicular to the third plate-like portion 23 having the opening 23a on the inflow side (may also be the outflow side) and the fifth plate-like portion 25.

The opening 26a has a cylindrical inner circumferential surface.

The main connection member 5 includes a plate-like connection portion 51, and a support cylindrical portion 52 having a cylindrical shape that extends from the connection portion 51 in a state of being inserted into the opening 26a. A through-hole is formed in the connection portion 51 of the main connection member 5, and the through-hole communicates with the inside of the support cylindrical portion 52 on the inner surface side of the connection portion 51 and communicates with the inside of the main connection pipe 4 on the outer surface side. Accordingly, the support cylindrical portion 52 and the main connection pipe 4 communicate with each other.

In addition, the inner surface of the connection portion 51 comes into surface contact with the side surface of the outside of the opening 26a of the sixth plate-like portion 26 such that the opening 26a is in a state of being blocked in a state where the main connection member 5 is connected to the casing 2. However, the opening 26a communicates with the sub-connection pipe 6 via the support cylindrical portion 52.

An annular support groove 53 is formed on the outer circumferential side of the support cylindrical portion 52 of the connection portion 51.

The inner diameter of the cylindrical opening 26a and the outer diameter of the cylindrical support groove 53 are substantially equal to each other. The inner diameter of the support groove 53 and the outer diameter of the support cylindrical portion 52 are substantially equal to each other. The outer diameter of the support cylindrical portion 52 is narrower than the inner diameter of the opening 26a. In addition, the opening 26a, the support cylindrical portion 52, and the support groove 53 are disposed on substantially the same axis.

Similarly to the case of the sub-connection member 7, instead of providing the support groove 53, an annular protrusion may be provided. The sub-connection member 7 and the main connection member 5 have different structures in the sub-connection pipe 6 and the main connection pipe 4 provided therein. However, since the shapes of the connection portions 51 and 71 on the inner surface sides are substantially the same, the support cylindrical portion 72 and the support cylindrical portion 52 have the same shape, and the support groove 73 and the support groove 53 have the same shape.

The cylindrical seal member 77 is provided in the support cylindrical portion 52 to cover the outer circumference thereof. That is, the support cylindrical portion 52 is inserted into the cylindrical seal member 77. The seal member 77 is the same as the cylindrical seal member 77 on the above-mentioned sub-connection member 7 side, and has the same shape and the same function.

According to the above-described seal member 77, the base end portion sides seal the openings 25a and 26a of the casing 2 with the circumferential surface seal portions 79. Basically, the circumferential surface seal portions 79 on the base end portion sides of the body portions 78 of the seal members 77 cover and seal between the inner circumferential surfaces of the openings 25a and 26a and the support cylindrical portions 52 and 72, which are respectively inserted into the openings 25a and 26a.

That is, the circumferential surface seal portions 79, which protrude from the outer circumferential surface sides of the base end portions of the seal members 77 in the three stages, are in a state where the thicknesses thereof between the inner circumferential surfaces of the openings 25a and 26a and the support cylindrical portions 52 and 72 are compressed, and the cooling water is sealed by this part. That is, the circumferential surface seal portion 79 functions as a seal ring.

In a state where the tip end portion of the seal member 77 is pressed against the outer circumferential surface of the rotor 1, the inwardly curved portion 81 of the tip end abutting portion 80 functions as a spring such that a sealed state is achieved in a state where the tip end of the seal members 77 is pressed against the rotor 1.

In this case, the inwardly curved portion 81 is not simply compressed as a rubber-like elastic member, but undergoes bending deformation to function as the spring. Accordingly, compressive stress, tensile stress, and shearing stress occur due to the bending.

Therefore, the tip end abutting portion 80 can obtain a relatively large basing force as the spring, and has a large elastic deformation amount.

By the basing force of the inwardly curved portion 81 as the spring, the infiltration of foreign matter between the seal member 77 and the rotor 1 is prevented. In a case where the foreign matter is infiltrated, the member for sealing can be significantly deformed and thus the foreign matter is easily removed. In addition, the end surface of the seal member 77 on the base end portion side is pressed against the sub-connection member 7 (the main connection member 5) by the biasing force of the inwardly curved portion 81 which functions as the spring, thereby proving a sealing function. Due to the followability of the spring with respect to the outer circumferential surface of the rotor 1 and the like, a heavy load is not applied to the rotation of the rotor 1, and for example, a low frictional material such as polytetrafluoroethylene is not needed for the part which abuts on and slides with the rotor 1. Here, it may be preferable to use a material having a coefficient of friction as low as possible.

The seal member 77 which is a single member and includes the circumferential surface seal portions 79 that functions as the seal ring on the base end portion side as described above and the tip end abutting portion 80 (the inwardly curved portion 81) which functions as the seal that abuts on the rotor 1 and functions as the spring. That is, the single member can realize at least three functions. Note that, it may be preferable that as the rubber or resin material used in the seal member 77, those having a coefficient of friction as low as possible be selected among rubber or resin materials having the performance for functioning as the seal ring, the seal, and the spring described above.

Figure 6:
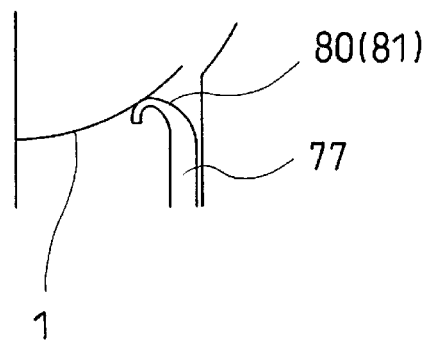
FIG. 6 is a main part cross-sectional view illustrating an inwardly curved portion as a tip end abutting portion of the seal member.
Figure 7:
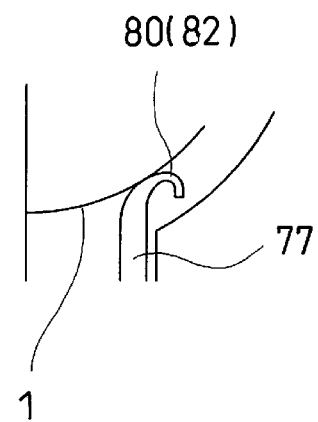
FIG. 7 is a main part cross-sectional view illustrating an outwardly curved portion as the tip end abutting portion of the seal member.

In this embodiment, as the tip end abutting portion 80, for example, the inwardly curved portion 81 illustrated in FIG. 6 is provided. However, an outwardly curved portion 82 illustrated in FIG. 7 may also be provided. The outwardly curved portion 82 extends from the body portion 78 of the seal member 77 toward the rotor 1 and abuts on the outer circumferential surface of the rotor 1. The outwardly curved portion 82 is widened outwardly toward the tip end side, and is curved to be folded back. The curved part between the base end portion and the tip end portion of the outwardly curved portion 82 comes into contact with the outer circumferential surface of the rotor 1.

The outwardly curved portion 82 is curved outward, but functionally has the same functions as those the inwardly curved portion 81 and functions as the seal and the spring. In addition, for example, in a case where the cooling water flows from the rotor opening 15 side to the openings 25a and 26a of the casing, that is, in a case where a water pressure inside the rotor 1 is higher than that outside the rotor 1, it may be preferable to use the above-described inwardly curved portion 81, and higher seal performance than a case of using the outwardly curved portion 82 can be obtained.

Contrary to this, in a case where the cooling water flows from the openings 25a and 26a of the casing to the rotor opening 15, that is, in a case where a water pressure outside the rotor 1 is higher than that inside the rotor 1, it may be preferable to use the above-described outwardly curved portion 82, and higher seal performance than a case of using the inwardly curved portion 81 can be obtained.

Figure 8:
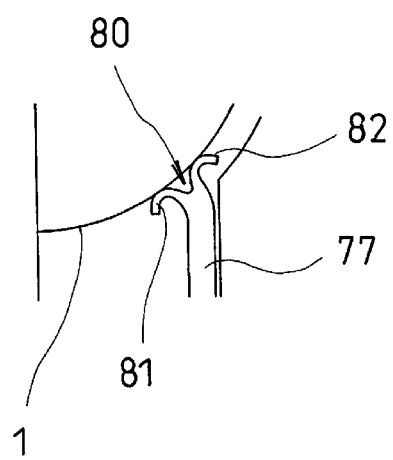
FIG. 8 is a main part cross-sectional view illustrating the inwardly curved portion and the outwardly curved portion as the tip end abutting portion of the seal member.

In addition, in a case where the direction of the water flow is changed, for example, as illustrated in FIG. 8, both the inwardly curved portion 81 and the outwardly curved portion 82 may be provided as the tip end abutting portion 80. In this case, even when the water flow direction is changed, the seal performance can be prevented from being degraded.

DECRIPTION OF REFERENCE CHARACTERS 1 rotor
2 casing
2a rotor accommodating space
15 rotor opening
25a casing opening
26a casing opening
77 seal member
78 body portion
79 circumferential surface seal portion
80 tip end abutting portion
81 inwardly curved portion
82 outwardly curved portion

What is claimed is:
1. A rotary valve comprising:
a rotor which is rotated to open and close a flow passage; and
a casing which accommodates the rotor,
wherein a rotor opening, which is a part of a passage of a fluid, is formed in a cylindrical outer circumferential surface of the rotor,
a rotor accommodating space, which rotatably accommodates the rotor, is formed in the casing,
a casing opening, which provides a passage of the fluid when communicating with the rotor opening, is formed in an inner surface of the rotor accommodating space of the casing that faces the rotor,
a cylindrical seal member, which extends to abut on an outer circumferential surface of the rotor, including the rotor opening, is provided in the casing opening,
the cylindrical seal member includes a cylindrical body portion and a tip end abutting portion provided at a tip end portion of the body portion on a rotor side of the cylindrical seal member, the tip end abutting portion being integrated with the body portion toward the outer circumferential surface of the rotor and abutting on the outer circumferential surface of the rotor,
the tip end abutting portion has a cylindrical shape and is curved along the outer circumferential surface of the rotor,
the tip end abutting portion includes at least one of an inwardly curved portion that is curved inwardly toward a tip end side and is folded back in an approximately axial direction of the cylindrical body portion and an outwardly curved portion that is curved outwardly toward the tip end side and is folded back in the approximately axial direction of the cylindrical body portion, and
the cylindrical seal member is disposed so that the at least one inwardly curved portion and outwardly curved portion is pressed against the outer circumferential surface of the rotor.

2. The rotary valve according to claim 1, wherein the at least one inwardly curved portion and outwardly curved portion of the tip end abutting portion of the cylindrical seal member has a smaller wall thickness than the cylindrical body portion of the cylindrical seal member.

3. The rotary valve according to claim 1, wherein the casing opening is formed in the casing to have a cylindrical shape,
the cylindrical seal member is supported by a support cylindrical portion formed in the casing opening, and
the body portion of cylindrical seal member includes a thick wall portion, the thick wall portion being thicker than an interval between the support cylindrical portion and the casing opening, and the thick wall portion is provided between the support cylindrical portion and the casing opening.

4. The rotary valve according to claim 1, wherein the casing opening is formed in the casing to have a cylindrical shape,
the cylindrical seal member is supported by a cylindrical support cylindrical portion formed in the casing opening formed in the casing opening, and
the tip end abutting portion is provided closer to the rotor side than a tip end portion of the support cylindrical portion.

5. The rotary valve according to claim 3, wherein the tip end abutting portion is provided closer to the rotor side than a tip end portion of the support cylindrical portion.

6. A vehicle comprising:
an engine;
a radiator;
a main passage through which cooling water is circulated between the engine and the radiator;
a cooling water control valve provided in the main passage, an opening degree of the cooling water control valve controlling an amount of the cooling water that flows through the main passage,
wherein the cooling water control valve includes the rotary valve according to claim 1.

7. A seal for a rotary valve that includes a rotor and a casing having a rotor accommodating space to accommodate the rotor, the seal comprising:

a seal member that extends to abut on an outer circumferential surface of the rotor, the seal member being provided in a casing opening of the rotor accommodating space, wherein the seal member includes a body portion and a tip end abutting portion provided at a tip end portion of the body portion, the tip end abutting portion is integrated with the body portion toward the outer circumferential surface of the rotor and abuts the outer circumferential surface of the rotor, and the tip end abutting portion includes at least one of an inwardly curved portion that is curved inwardly toward an inside of the casing opening and folded back in an approximately axial direction of the cylindrical body portion, and an outwardly curved portion that is curved outwardly toward an outside of the casing opening and folded back in the approximately axial direction of the cylindrical body portion.

8. The seal member according to claim 7, wherein the tip end abutting portion includes only the inwardly curved portion.

9. The seal member according to claim 7, wherein the tip end abutting portion includes only the outwardly curved portion.

10. The seal member according to claim 7, wherein the tip end abutting portion includes both the inwardly curved portion and the outwardly curved portion.

11. The seal member according to claim 8, wherein the inwardly curved portion functions as a spring and is in a state of being elastically deformed by being pressed against the outer circumferential surface of the rotor.

12. The seal member according to claim 7, wherein the seal member includes a surface seal portion provided at an end of the body portion opposite the tip end abutting portion, the surface seal portion abutting an inner surface of the casing in the casing opening.

13. A vehicle comprising:
an engine;
a radiator;
a main passage through which cooling water is circulated between the engine and the radiator;
a cooling water control valve provided in the main passage, an opening degree of the cooling water control valve controlling an amount of the cooling water that flows through the main passage,
wherein the cooling water control valve includes the seal according to claim 7.

\* \* \* \* \*

UNITED STATES PATENT AND TRADEMARK OFFICE
CERTIFICATE OF CORRECTION

| | | |
|---|---|---|
| PATENT NO. | : 9,567,894 B2 | Page 1 of 1 |
| APPLICATION NO. | : 14/549963 | |
| DATED | : February 14, 2017 | |
| INVENTOR(S) | : Takumi Oikawa et al. | |

It is certified that error appears in the above-identified patent and that said Letters Patent is hereby corrected as shown below:

In the Claims

Column 14, Lines 48-49 (Claim 4), delete "formed in the casing opening formed in the casing opening," and insert --formed in the casing opening,--, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*